Fig.1.

Inventor
Donald L. Watrous
by Paul A. Frank
His Attorney

Inventor
Donald L. Watrous
by Paul A. Frank
His Attorney

Fig. 4.

Inventor
Donald L. Watrous
by Paul A. Frank
His Attorney

Inventor
Donald L. Watrous
by His Attorney

United States Patent Office 3,233,116
Patented Feb. 1, 1966

3,233,116
CONTROL RECTIFIERS HAVING TIMING MEANS ENERGIZED IN RESPONSE TO LOAD EFFECTING COMMUTATION
Donald L. Watrous, Scotia, N.Y., assignor to General Electric Company, a corporation of New York
Filed Nov. 28, 1961, Ser. No. 155,333
24 Claims. (Cl. 307—88.5)

This invention relates to a power supply wherein the power supplied to a load is accurately controlled. More specifically, the invention relates to a power supply wherein the power consists of rectangular-shaped pulses of power which can be accurately adjusted as to pulse width, amplitude, spacing between pulses and number of pulses.

In many applications, it is desirable to be able to produce consistently identical power pulses. This is particularly true in the field of welding in order to assure that the welds produced thereby are of consistent quality. While in the past capacitor discharge welders have been mainly used to produce single power pulses, in this type of welder the capacitor ages with time and does not produce consistently identical power pulses so that under such conditions inferior welds result. Again, the distribution of energy is non-uniform and the energy waveshape is uncontrolled, the shape being a function of many variables including the load and output transformer. Further, since the energy in a capacitor is a function of the square of the voltage, the difference in weld energy between that desired and actually obtained varies as the square of any error in setting of the voltage.

In the past, sine wave welders have also been employed to obtain repetitive or multipulses of power. While this type of control is useful, it has several limitations. Since the control is dependent on the power supply frequency, the repetition rates of pulses are limited to every cycle of power or at most every half-cycle. Further, to obtain pulse widths of less than one half-cycle, the amplitude of the power pulses becomes a function of the conduction phase angle. A slight change in this phase angle results in a considerably different weld being produced. Also, it is not possible to generate pulse widths of less than a half-cycle effectively, even though desired in a particular welding operation, due to the inherent loss in pulse amplitude.

Therefore, one of the principal objects of this invention is to provide an improved power supply which produces a single, fixed amplitude, adjustable width pulse of power for each closing of the initiating control circuit.

Another principal object of this invention is to provide an improved power supply which produces consistently identical multiple pulses of power for each closure of the initiating control means, the number of pulses not being a function of the power supply frequency.

A further object of this invention is the provision of an improved preset pulse counter which can accurately count the number of pulses and, after a prescribed number, automatically inhibit the generation of further pulses.

Another object of this invention is the provision of an improved pulse timing circuit which accurately maintains the period of all subsequent oscillations equal to the first oscillation.

In meeting the objects enumerated above, a control circuit actuated by control means or contacts initiates a cycle of operations in which a first semiconductor device employed as a controlled rectifier becomes conductive and conducts current through an output transformer to welding electrodes, while a second controlled rectifier, which determines the pulse width, remains non-conductive. After the first rectifier has conducted for the prescribed pulse width time as determined by a pulse width timing circuit, the control circuit brings the second rectifier into a conductive state, making the first rectifier non-conductive, thereby ceasing operation of the single-pulse power supply until the control contacts are again actuated.

In the case of a multipulse power supply, the two rectifiers are alternately made conductive by a pulse spacing timing circuit and a pulse width timing circuit, respectively, to produce multipulses of power. A preset pulse counter counts the number of pulses and at the end of the preset number automatically ceases operation of the power supply.

The invention together with further objects and advantages thereof, may best be understood by reference to the following description when considered in connection with the accompanying drawings, wherein like parts in each of the several figures are identified by the same reference character, and wherein.

An example showing the use of the power supply of this invention to produce a superior weld is more fully described in copending application of John D. Harnden, Jr., Serial No. 155,431, now abandoned, filed concurrently herewith, and which is assigned to the same assignee.

Figure 1:
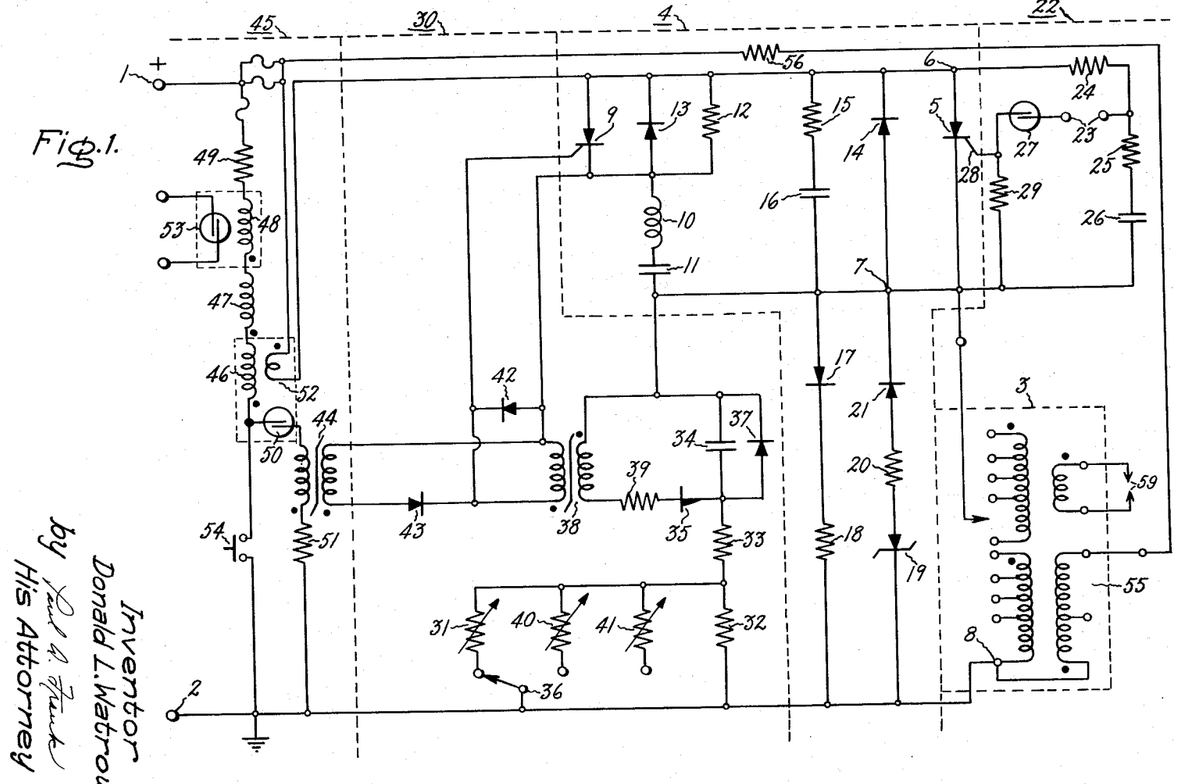
FIGURE 1 is a circuit diagram illustrating a single pulse power supply embodiment of this invention.

Considering now in detail the construction of the single pulse power supply in FIGURE 1, the bus conductors 1 and 2 are connected to any suitable source of direct current of the required potential. It is to be understood that the direct current source referred to, in both the single pulse and multipulse power supplies, can be any source which ultimately produces direct current. The following examples are suitable sources, although it must be understood that the sources are not limited to these illustrations: direct current generator, battery, rectified single phase alternating current and rectified polyphase alternating current.

The power to the welding or output transformer 3 is controlled by a static switch shown in the form of a silicon controlled rectifier switching circuit which is designated as a whole by the numeral 4. This circuit consists of the following elements: silicon controlled rectifier 5, which provides power for the load, is connected across points 6 and 7, point 6 being connected to the positive bus conductor. The output transformer 3 is connected across points 7 and 8, point 8 being connected to bus conductor 2. The second silicon controlled rectifier 9, which determines the pulse width, is connected from point 6 in series with inductor 10 and capacitor 11 to point 7. Resistor 12 is connected in parallel with controlled rectifier 9 and in series with inductor 10 and capacitor 11 to provide a charging path for capacitor 11 from the bus conductor 1. Diode 13 is connected in parallel with resistor 12 to provide a discharge path for capacitor 11. Diode 14 is connected in parallel with controlled rectifier 5 in a manner to cause controlled rectifier 5 to become non-conductive after diode 14 conducts current. Resistor 15 and capacitor 16 are connected in series across controlled rectifier 5, and act as a transient voltage suppressor. Diode 17 and resistor 18 are connected in series across the output transformer 3 and provide a dummy load which permits the switching circuit 4 to operate under all conditions of output transformer load. Zener diode 19, resistor 20, and diode 21 are also connected in series across the primary winding means of output transformer 3 and are used to limit the reset rate of the output transformer so that the controlled rectifiers will not be subjected to excessive voltage. The Zener diode 19 functions as a voltage clipping device.

The switching circuit 4 functions in the following manner.

In the quiescent state neither of the controlled rectifiers 5 and 9 is conducting and capacitor 11 is charged from the positive potential bus 1 through resistor 12, inductor 10, and transformer 3. Thus, in the quiescent state the static switch is turned off. When the first controlled rectifier 5 becomes conductive and conducts in a manner to be subsequently described, the static switch is turned on and capacitor 11 discharges through inductor 10 in an oscillatory manner, the first half-cycle of current flowing through diode 13, and the first controlled rectifier 5. When the first controlled rectifier 5 conducts, it presents a very small impedance, therefore, the bus potential 1, 2, has been switched essentially across the output transformer 3, points 7 and 8, thereby permitting load current to flow through the primary winding means of the output transformer 3. The first controlled rectifier 5 thus carries both the load current and the oscillatory current. The resistance of resistor 12 is selected to be sufficiently small to permit charging of capacitor 11 in a reasonable time, and must be sufficiently large to minimize the discharge of capacitor 11 during the load pulse after reversal of voltage across capacitor 11. When the second controlled rectifier 9 becomes conductive in a manner to be subsequently described, the current through capacitor 11 and inductor 10 continues to oscillate. During the second half-cycle, the current discharges through diode 14 and the second controlled rectifier 9. The conduction of diode 14 causes a voltage of reversed polarity to form across controlled rectifier 5 thereby rendering it non-conductive. At this time, the impedance presented by the non-conducting controlled rectifier 5 is very large, therefore the bus potential has been switched essentially across the controlled rectifier 5, points 6 and 7, and no load current flows through the primary winding means of the output transformer 3. The static switch is now turned off and the first controlled rectifier 5 remains non-conducting until it becomes conductive again by actuation from the turn-on circuit.

The advantage of using silicon controlled rectifiers in the switching circuit 4 is that the inherent shorter recovery time of this semiconductor device permits the more rapid generation of power pulses than in the case of thyratrons. Further, the inherent smaller forward voltage drop of the silicon controlled rectifier permits fuller utilization of the bus voltage across the output transformer 3. It is the bus voltage which determines the amplitude of the power pulses in this power supply.

The turn-on circuit designated as a whole by the numeral 22 functions to prevent generation of random power pulses. The elements of this circuit are as follows: resistor 24, resistor 25, and capacitor 26 are connected in series across points 6 and 7 and form a resistor-capacitor circuit for a purpose to be subsequently described. The control contacts 23 which actuate the turn-on circuit are connected at one end between the junction of resistors 24 and 25. The other end of the control contacts are connected to contacts 27 of a switching device (the particular embodiment shown as a glass reed switch) which functions to prevent the turn-on circuit from becoming actuated when a circuit breaker, described hereinafter, is open due to excessive current. The other side of contacts 27 is connected to the junction of gating electrode 28 of the first controlled rectifier 5 and resistor 29 which provides bias potential for controlled rectifier 5. The other side of resistor 29 is connected to point 7. The turn-on circuit must provide a single-firing pulse for each closure of the control contacts 23, which may be cam actuated. This is accomplished by employing the resistor-capacitor circuit 24, 25, 26. Closure of control contacts 23 completes a discharge circuit for capacitor 26 which is charged from the bus 1 through the resistors 24 and 25, permitting it to discharge through resistor 25, closed contacts 23 and 27 and resistor 29 to apply a voltage pulse to the gating electrode 28 thereby causing the first controlled rectifier 5 to become conductive. The peak discharge current is limited by resistor 25. The resistor-capacitor time constant of elements 24, 25, 26 is adjusted so that capacitor 26 cannot be charged sufficiently to again render the first controlled rectifier 5 conductive should the cam contacts intermittently open and close.

The timing or turn-off circuit designated as a whole by numeral 30 is basically a relaxation oscillator circuit utilizing a PNPN four layer diode in the illustrated embodiment. This timing oscillator circuit consists of variable resistor 31, resistors 32, 33 capacitor 34 and the PNPN four layer diode 35. A switch 36 connects one of the three variable resistors 31, 40, 41 which provide for three electrically selectable pulse widths, to the bus conductor 2. Resistor 32 is connected from bus conductor 2 to the other end of variable resistors 31, 40, 41. Resistor 33 is connected from this point to a junction point. From this junction point capacitor 34 is connected in parallel with diode 37 in a series circuit with the primary winding of transformer 38, resistor 39 and the PNPN four layer diode 35, completing the loop back to the junction point.

The power for the timing circuit is taken directly across the primary of the output transformer 3, points 7 and 8. Thus the capacitor 34 begins to charge through a selected one of the variable resistors 31, 40 and 41 and the timing circuit begins its function of determining the time duration of the power pulse or pulse width when power is applied to the output transformer. When the capacitor 34 is charged to the breakdown voltage of the diode 35, the diode breaks down and the capacitor discharges. The discharge of the capacitor 34 is coupled through transformer 38 to the second controlled rectifier 9. Thus at the end of one timing period which is one oscillation of the relaxation oscillator circuit, a pulse is generated which permits the second controlled rectifier 9 to become conductive, thus reducing to zero the output transformer voltage and thereby also disabling the timing oscillator. Resistor 39 limits the peak discharge current to a safe value. Diode 37 prevents a voltage of reverse polarity from that desired from developing across the capacitor 34, thus insuring a more constant timing period. This reverse polarity voltage could develop from the oscillation of capacitor 34 and the after saturation inductance of the transformer 38 primary winding. Reverse polarity voltage on capacitor 34 can also be produced by the negative primary voltage of the output transformer 3 during its reset. Diode 42 is connected across the secondary of transformer 38 and the gating electrode and cathode of the second controlled rectifier 9 and prevents any negative voltage from appearing on the gating electrode of the second controlled rectifier 9. Diode 43 is connected in series with the secondary windings of transformers 38, 44 and insures that the correct polarity pulse will be transferred from the secondary of transformer 44 to the second controlled rectifier 9 in response to operation of the circuit breaker presently to be described. The timing circuit should be designed so that application of its timing signal to rectifier 9 does not occur until the first half cycle of oscillation between inductor 10 and capacitor 11 is substantially completed.

The circuit breaker designated as a whole by numeral 45, employs a switching device (the particular embodiment shown as glass reed switches) as a fast current sensitive switch. The function of this circuit breaker is to detect an excessive line current and to thereby cause the second controlled rectifier 9 to conduct and turn off the pulse power circuit. If the output transformer primary current does not rise too rapidly, the turn-off circuit 30 is able to turn off the pulse power circuit before excessive currents are reached.

The circuit breaker 45 consists of three glass reed switches. Each switch includes one pair of contacts and at least one coil. Two of the switches are shown enclosed by dashed lines in the figure. Thus coil 48 and contacts 53 comprise one switch and oppositely poled coils 46, 52 and contacts 50 comprise a second switch. The third switch consists of coil 47 and contacts 27 which are located in the gating electrode circuit of the first controlled rectifier 5. Coils 46, 47, 48 are in a series circuit across bus conductors 1, 2. These coils are in series with bias curent resistor 49, contacts 50, the primary of transformer 44 and resistor 51. Glass reed switch coil 52 is connected in series with the section of bus conductor 1 that provides power to the controlled rectifiers 5 and 9. A bias current flowing through the coils 46, 47, and 48 keeps the reed switch contacts closed. When the line current reaches the trip point of circuit breaker 45 as determined by the line current flowing through coil 52, the net ampere turns on this reed switch will fall below the holding value and all three reed switches will open. The loss of current through the primary of transformer 44 will generate a pulse of current through diode 43 to cause the second controlled rectifier 9 to conduct. The contacts 53 associated with glass reed switch coil 48 are used for remote indication and control. The contacts 27 associated with glass reed switch coil 47, when open, prevent the pulse power circuit from being turned on until the breaker has been reset since these contacts are in the gating electrode circuit of the first controlled rectifier 5. The breaker must be manually reset each time the main power is applied and the breaker trips off. The breaker can be reset by depressing switch 54 which is in parallel with reed switch contacts 50, the primary of transformer 44, and resistor 51.

A reset winding 55 which is in series with resistor 56 across the bus conductors 1, 2, is employed in the output transformer 3 to obtain proper pulse operation after the first power pulse is generated by resetting the transformer flux to its original condition, preferably a saturated condition. Winding 55 is oppositely poled with respect to the primary winding means.

Welding electrodes 59, which utilize the power pulses to weld materials, are connected across a secondary winding of output transformer 3.

Figure 2:
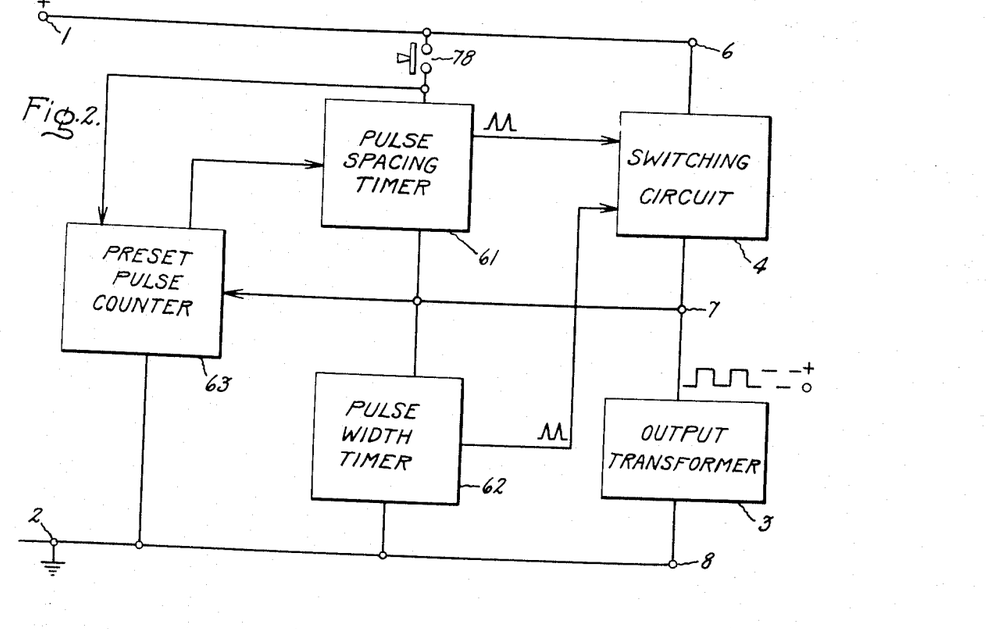
FIGURE 2 is a block diagram illustrating the components of a multipulse power supply embodiment of this invention.

FIGURE 2 is a block diagram of the multipulse power supply. A component indicated as switching circuit 4 is basically identical to the switching circuit 4 employed in the single pulse power supply. The conduction of a first controlled rectifier switches point 7 to essentially the potential of point 6, thereby placing the direct current bus potential across the output transformer 3 and initiating a power pulse to the output transformer. Conduction of a second controlled rectifier causes the first controlled rectifier to become non-conductive and switches point 7 to essentially the potential of point 8, thereby placing the bus potential across the switching circuit 4 and ceasing current flow to the output transformer. The pulse width timer 62 determines when the second controlled rectifier will become conductive as in the case of the single pulse power supply. The pulse spacing timer 61 determines when the first controlled rectifier will become conductive in order to generate the next power pulse. The preset pulse counter 63 is set to count the number of power pulses that are required for the particular weld to be performed. At this preset number, the counter provides a signal which inhibits generation of any further power pulses by the switching circuit 4.

Figure 3:
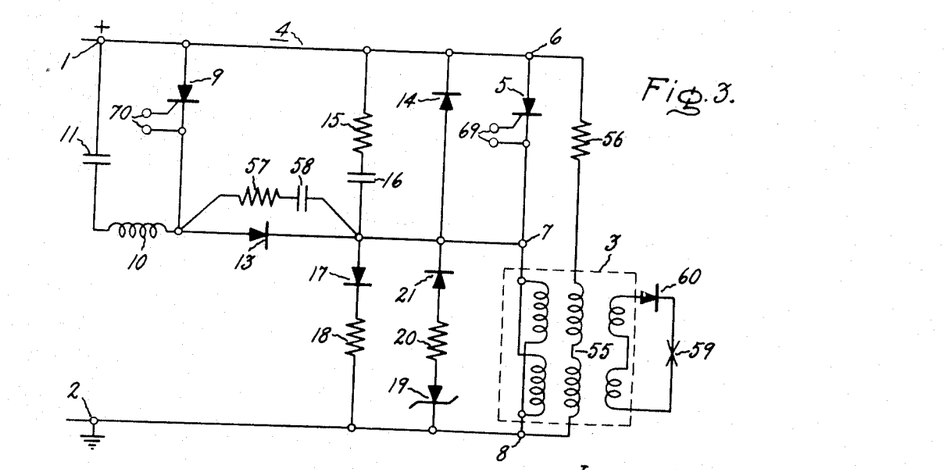
FIGURE 3 is a circuit diagram of the switching circuit shown in FIGURE 2 block diagram.

FIGURE 3 illustrates the multipulse power switching circuit 4 indicated in FIGURE 2 which is essentially identical to the switching circuit 4 employed in the single pulse power supply. The numerals in FIGURE 3 represent the identical components used in FIGURE 1 which depicts the single pulse power supply. The only distinction between the two circuits is the connection of inductor 10 and capacitor 11 and diode 13. In this circuit, capacitor 11 cannot discharge through the first controlled rectifier 5 as in the case of the single pulse power supply due to the blocking action of diode 13. Therefore, the oscillatory current caused by capacitor 11 discharging through inductor 10 is carried solely by the second controlled rectifier 9 and a significant advantage is obtained in that the load power handling rectifier 5 does not have to carry any of the oscillatory current as in the case of the circuit of FIGURE 1. Resistor 57 and capacitor 58, which are connected across diode 13, comprise a transient voltage suppressor. As explained in the aforementioned application S.N. 155,431, in the quiescent state, neither of the rectifiers 5 and 9 is conducting and capacitor 11 is charged from the conductor 1 through inductor 10, diode 13, and the primary winding of transformer 3. The rectifier 5 is rendered conducting in response to a signal applied to its gate from the pulse spacing timer 61 to thereby begin the generation of a power pulse. Rectifier 9 is rendered conducting by application of a signal to its gate from the pulse width timer 62, and when this occurs, capacitor 11 discharges in an oscillatory manner, the first half cycle of discharge current flowing through rectifier 9 and inductor 10 and the second half cycle of the capacitor discharge current thereafter flowing through inductor 10 and diodes 13 and 14. The current flowing through diode 14 causes both the rectifiers 5 and 9 to be rendered non-conductive thereby terminating the power pulse.

In order to generate several weld power pulses without opening the welding jaws 59, a diode 60 is connected in the secondary winding of transformer 3 in series with the jaws 59 and is poled to prevent current flow in the secondary winding caused by voltage induced therein during the flux resetting action. This diode thus prevents induction of a counter voltage in the reset winding and permits the transformer 3 to be reset between pulses. If the diode is not used, the output transformer 3 must be larger by a factor equal to the number of pulses to be generated.

Figure 4:
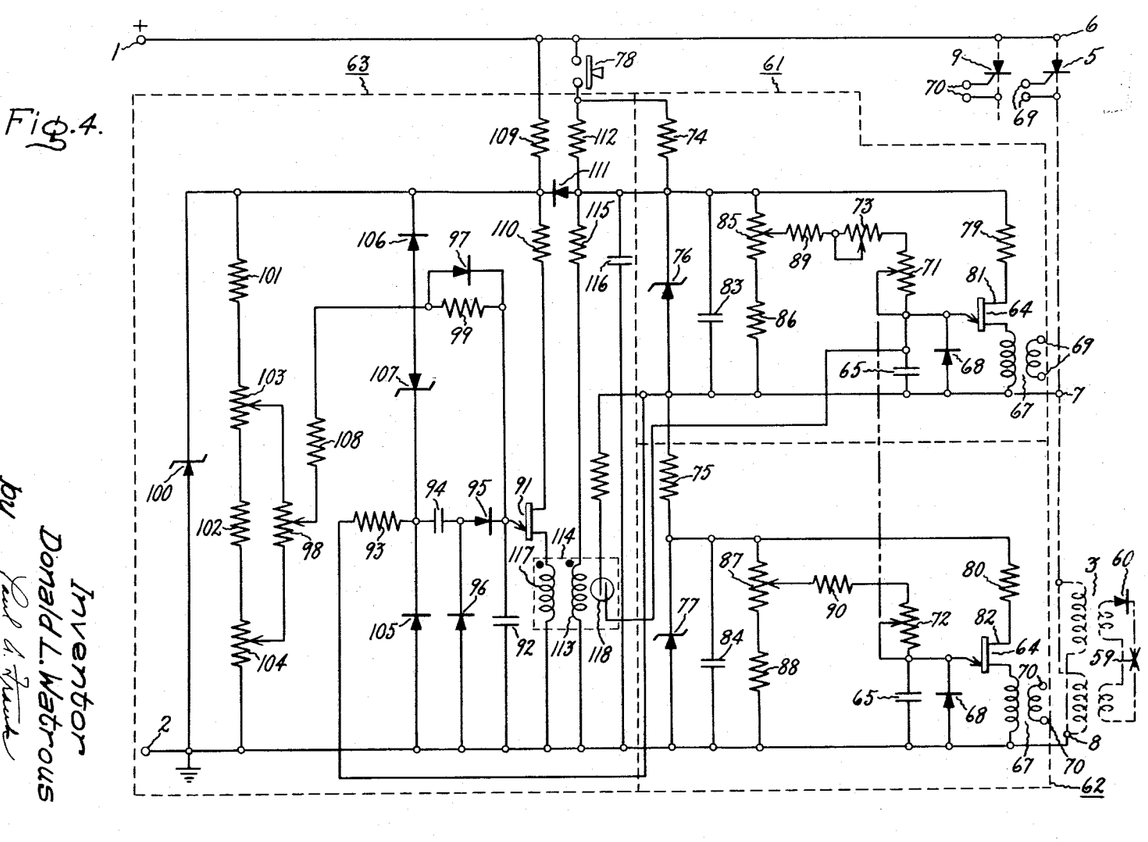
FIGURE 4 is a circuit diagram illustrating the preset pulse counter and pulse timing controls shown in the FIGURE 2 block diagram.

FIGURE 4 shows the timing control circuit which regulates the switching circuit 4. The pulse spacing timer designated as a whole by numeral 61 regulates the time at which the first controlled rectifier 5 becomes conductive. The pulse width timer designated as a whole by numeral 62 regulates the time at which the second controlled rectifier 9 becomes conductive. The preset pulse counter 63 determines the number of power pulses to be produced by the first controlled rectifier 5 for a particular welding operation.

The details of FIGURE 4 will be described after the following discussion of the unijunction transistor relaxation oscillator circuits shown in FIGURES 5c, 6c, and 7. The particular circuit of FIGURE 7 is employed in both the pulse spacing timer 61 and pulse width timer 62 of FIGURE 4.

Figure 5A:
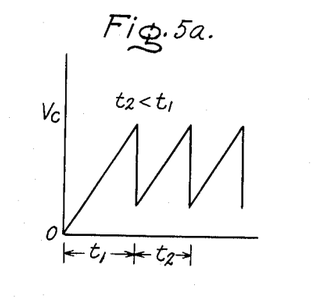
FIGURES 5a, b, c, illustrate a conventional unijunction transistor relaxation oscillator and various associated characteristic curves.
Figure 5B:
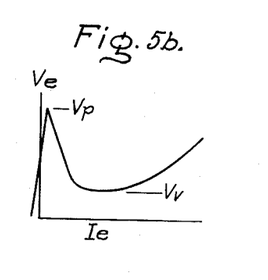
Figure 5C:
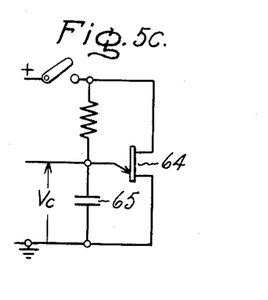
Figure 6A:
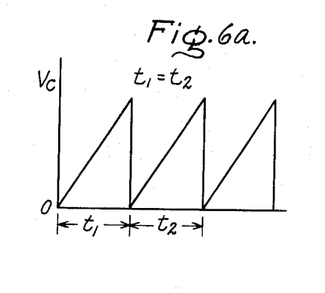
FIGURES 6a, b, c, illustrate a unijunction transistor relaxation oscillator embodying concepts of this invention and various associated waveforms.
Figure 6B:
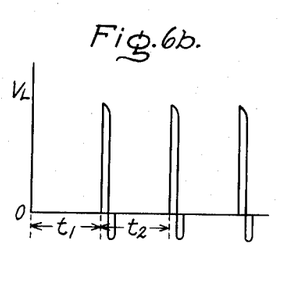
Figure 6C:
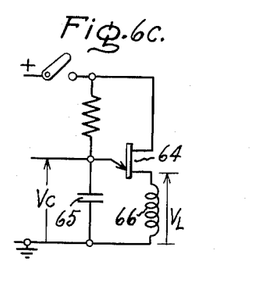
Figure 7:
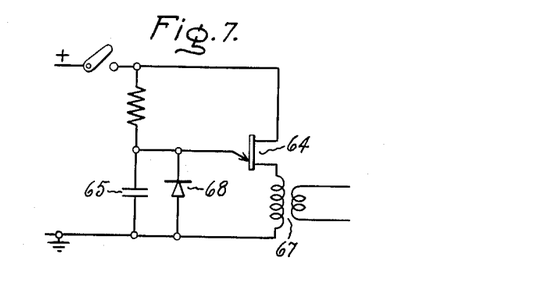
FIGURE 7 illustrates a unijunction transistor relaxation oscillator used in the timing circuits of the multipulse power supply of this invention.

The unijunction transistor 64 in FIGURES 5c, 6c, and 7, is well-known for its stable operation when used in a relaxation oscillator. In applications where the unijunction transistor is used in an oscillator, no consideration is given to the timing transient that occurs during the first cycle of operation. In operations where the unijunction transistor is used in a delay or timing device, only the first cycle of oscillation is employed. In the welder timing circuit, the unijunction transistor is required to oscillate (or time) for one to twenty cycles with a constant time period per cycle.

The waveform of voltage $V_c$ on the timing capacitor 65 versus time in a conventional unijunction transistor relaxation oscillator is shown in FIGURE 5a. When power is applied, capacitor 65 starts charging from zero toward the unijunction transistor peak point voltage $V_p$. FIGURE 5b shows the emitter characteristics ($V_e$ vs. $I_e$) of the unijunction transistor. At the end of the first cycle, the capacitor discharges to the unijunction transistor valley voltage $V_v$. Thus the second and subsequent cycles are shorter in time ($t_2$ less than $t_1$).

By adding an inductor 66 (FIGURE 6c) in the discharge circuit of the relaxation oscillator, the capacitor discharge becomes oscillatory. Although FIGURE 6c shows one particular connection for this inductor, it can be located anywhere in the discharge circuit. By a proper choice of inductance value the inductor voltage $V_L$ of FIGURE 6b can cause the unijunction transistor base voltage to become negative in polarity and equal to the positive polarity unijunction transistor valley voltage $V_v$ thus returning the capacitor to zero voltage at the end of the cycle as in FIGURE 6a. Thus, the timing period of the relaxation oscillation is determined by the resistor-capacitor time constant and the peak point voltage of the unijunction transistor. Resetting action of the capacitor is determined by the sinusoidal oscillation of the inductor-capacitor circuit. This same resetting technique could be employed by using switching detectors such as four layer diodes or neon glow lamps instead of the inductor.

The unijunction transistor circuit must supply current pulses to cause the initiating conduction of the controlled rectifiers in the welding circuit. These can be obtained by changing the inductor 66 into a pulse transformer 67 as shown in FIGURE 7. In doing this, the Q of the inductor-capacitor circuit becomes a function of the load on the pulse transformer. The circuit Q is, therefore, established for the heaviest load conditions. At lighter loads, or due to other changes in circuit operating conditions, the circuit will tend to cause the capacitor to become negatively charged at the end of each oscillation. The diode 68 is employed to prevent this by conducting whenever the cathode of the diode attains a negative potential. Since there is a finite voltage drop across a diode when it is conducting, diode 68 does not maintain the capacitor voltage at precisely zero. The diode finite voltage drop is, however, considerably less than the unijunction transistor valley voltage so net improvement in circuit performance results. The effect of the diode finite voltage drop can be reduced by introducing a bias diode (not shown). The finite voltage drops of the two diodes tend to cancel, thus allowing the capacitor to discharge to zero.

In FIGURE 4, the oscillator portions of the pulse spacing timer 61 and the pulse width timer 62 are identical with FIGURE 7. Identical elements of FIGURE 7 are shown in the pulse spacing timer 61 and in the pulse width timer 62 by the numerals 64, 65, 67, 68. The output of the pulse transformer 67 in the pulse spacing timer 61, which initiates conduction of the first controlled rectifier 5, is designated by numeral 69. The output of pulse transformer 67 in the pulse width timer 62, which initiates conduction of the second controlled rectifier 9 is designated by numeral 70. Variable resistors 71 and 72 in the pulse spacing and pulse width timer circuits respectively, are shown as being mechanically coupled but they could be separately adjustable. The adjustment of resistors 71 and 73 in the pulse spacing timer 61 determines the period of time between power pulses in the output transformer 3. The adjustment of the resistor 72 in the pulse width timer 62 determines the power pulse width. The remaining elements in the pulse spacing timer 61 and the pulse width timer 62 are similar and serve the same function. Thus, resistors 74 and 75 and Zener diodes 76 and 77, which are all connected in series across the bus conductors 1, 2 through an initiation switch 78 which is illustrated as being of the push-button type, furnish the desired voltage across each respective circuit. Resistors 79 and 80 which are connected to bases 81 and 82 of the unijunction transistors 64 limit the base current of these unijunction transistors. Filter capacitors 83 and 84 are connected across Zener diodes 76 and 77 respectively. Resistor 85 and resistor 86 which are connected in series across capacitor 83, and resistor 87 and resistor 88 which are connected in series across capacitor 84 determine the voltage to be applied to the timing capacitors 65. Resistors 89 and 90 which have terminals in adjustable contact with resistors 85 and 87, respectively, primarily determine the resistor-capacitor time constant for charging of the timing capacitors 65. As shown in FIG. 4, a circuit including capacitor 65 of the pulse spacing timer 61 and the switch 78 is connected across the rectifier 5 so that when this rectifier is nonconducting, closure of switch 78 initiates charging of capacitor 65 and the first timing operation of the pulse spacing timer 61. Thereafter, charging of capacitor 65 occurs in response to rectifier 5 being rendered nonconducting by operation of the pulse width timer 62 provided the switch 78 is maintained closed. Further, a circuit including capacitor 65 of the pulse width timer 62 is connected across the primary winding means of the output transformer so that this capacitor begins to charge when rectifier 5 is rendered conducting.

The unijunction transistor's switching characteristics, combined with the stable tripping voltage and relatively large peak power handling capabilities, makes it very useful in counting circuits. In FIGURE 4 unijunction transistor 91 is used in the preset pulse counter designated as a whole by numeral 63. In this circuit, counter storage capacitor 92 is connected between the emitter of unijunction transistor 91 and ground. For each power pulse generated at point 7, the counter storage capacitor accumulates some additional positive charge through the series network consisting of resistor 93, capacitor 94, and diode 95. The time constant as determined by resistor 93 and capacitors 92 and 94 is chosen so that capacitor 94 is completely charged during a power pulse so that the charging current for capacitor 92 will cease during the pulse. Capacitor 94 is typically much smaller than capacitor 92. In order to count power pulses of various widths, diode 96 is connected from the junction of capacitor 94 and diode 95 to ground, and in conjunction with resistor 93, forms a discharge path for capacitor 94 after each pulse. The counting capacity of the preset pulse counter is adjusted by varying a preset voltage which is applied to capacitor 92 and which is below the unijunction transistor peak point voltage. Automatic preset of voltage applied to capacitor 92 is achieved by the use of diode 97 which is connected to the emitter of unijunction transistor 91, and by means of a variable resistor network between diode 97 and the conductor 1 described hereinafter. At the end of a counting cycle the storage capacitor 92 is discharged due to the switching action of the unijunction transistor 91. This switching action occurs when the voltage at the emitter of the transistor reaches the peak point voltage. Capacitor 92 can now be charged quickly to its preset voltage through the low forward resistance of diode 97. At the end of the first counting pulse, the cathode of diode 97 assumes a positive voltage due to the positive charge on capacitor 92, and diode 97 thus represents a very large resistance. Thus, the counter storage capacitor 92 does not discharge between pulses and the effect of pulse spacing time, is therefore, negligible. However, when a lower value of preset voltage is selected by variation of variable resistor 98, the capacitor 92 is prevented from discharging by diode 97. By shunting diode 97 with resistor 99 the necessary discharge path is provided. The counter is now however sensitive to pulse spacings. This effect is negligible if the pulse spacing time is small, and can be made negligible for wider pulse spacing time by the proper choice of value of resistor 99. The capacitor could, of course, be preset to the lower voltage by omitting resistor 99 and actuating pushbutton 78.

The preset voltage is obtained from resistor 98 which is connected to the voltage regulating circuit comprised of Zener diode 100 in parallel with resistors 101, 102, 103, 104. The terminals of resistor 98 are in adjustable contact respectively with resistors 103 and 104 and a resistor 108 in series with resistor 99 has one of its terminals in adjustable contact with resistor 98.

By adjusting the preset voltage to different values, the counting capacity of the circuit can be changed.

With the addition of diode 105, which is connected between the junction of resistor 93 and capacitor 94 and ground, the counting circuit can operate satisfactorily with bi-polarity pulses. Diode 105, by having its anode at ground potential, prevents capacitor 94 from obtaining a negative charge, thereby eliminating the negative pulses. Diode 106 in series with Zener diode 107 is connected from one side of Zener diode 100 to diode 105. Diode 106 acts to clip the positive pulses to a voltage determined by the voltages of Zener diode 100 plus Zener diode 107. Resistor 108, which is connected between resistor 98 and resistor 99, limits current to prevent unijunction transistor 91 from becoming bistable. Resistor 109, connected between the bus conductor 1 and Zener diode 100 permits excitation of this Zener diode when pushbutton 78 is open. Resistor 110 limits the base current of unijunction transistor 91. Diode 111 and resistor 112 which are connected at one end to pushbutton 78, regulate the voltage on the bias winding 113 of glass reed switch 114. Diode 111 maintains the voltage at the point between resistors 112 and 115 at the regulated voltage of Zener diode 100. Capacitor 116, connected in parallel with resistor 115 and bias winding 113, prevents transients from being coupled back to the unijunction transistor 91 through the bias winding 113 and pulse winding 117 of glass reed switch 114. When the unijunction transistor 91 conducts in response to accumulation of a predetermined charge on capacitor 92 representative of a predetermined pulse count, the current through the pulse winding 117 of reed switch 114 overcomes the bias winding 113 ampere turns, thereby closing contacts 118 which are connected across timing capacitor 65, and inhibiting the pulse spacing timer 61 from producing any more pulses with which to render conductive the first controlled rectifier 5.

From the foregoing description, it can be appreciated that the invention makes available a new and improved power supply which, through the use of silicon controlled rectifiers, can produce single and multipulses of power that can be adjusted for the particular load operation as to pulse width, pulse spacing, number of pulses and even pulse amplitude if the bus voltage is made adjustable by any well-known means. The use of silicon controlled rectifiers, which are inherently more stable than the capacitors employed in capacitor discharge welding, permits a very consistent repetitive power pulse to be obtained, thereby resulting in superior welds. Further, the switching characteristics of the silicon controlled rectifier permits the generation of power pulses narrower than 8 milliseconds, a result which cannot be achieved with a conventional sine wave welder without resultant loss of amplitude. Also, the number of pulses is not dependent on the power supply frequency in this invention as it is in the case of sine wave welders. The number of pulses is regulated by a novel pulse counter in this invention, employing a unijunction transistor which permits a very accurate pulse count to be maintained, thereby resulting in superior welds. The timing of the pulses is controlled by a novel pulse timing circuit employing a unijunction transistor relaxation oscillator circuit. Finally, the provision in the multipulse power supply of the circuit whereby the oscillatory current is not carried by the load power handling rectifier permits fuller utilization of that rectifier's current rating. This circuit could obviously also be employed in the single pulse power supply.

Having described a new and improved power supply construction in accordance with the invention, it is believed obvious that other modifications and variations of the invention are possible in light of the above teachings. For example, it is not necessary that the controlled rectifiers be restricted to excitation by a single gate electrode signal. Therefore, multi-signal control is possible and could include feedback control signals. Also, the controlled rectifier can be controlled by other methods than the electrical process of gate electrode excitation, an example being actuation by pulses of light. Further, other devices whose volt-ampere characteristics are similar to the unijunction transistor, such as tunnel diodes or gas discharge lamps, may be used rather than the unijunction transistor. Also, other switching devices, such as relays, semiconductors and photo-resistors could be used in place of the glass reed switches disclosed herein. This invention is not limited to welding power supplies and is useful wherever power pulses are preferred as a source of energy. Further, through a simple modification in the pulse timer circuits, the programming of pulse spacing and pulse width can be accomplished. It is, therefore, to be understood that changes may be made in the particular embodiment of the invention described which are within the full intended scope of the invention as defined by the following claims.

What I claim as new and desire to secure by Letters Patent of the United States is:

1. A pulse power supply comprising, a welding transformer including primary and secondary winding means and reset winding means, a static switch effective when turned on for supplying load current from a source of direct current voltage to said primary winding means, a timing circuit operable a predetermined time after energization thereof to produce a timing signal, said timing circuit being connected across said primary winding means for energization in response to turn on of said static switch and energization of said primary winding means, means for applying said timing signal to said static switch for turning off the static switch, said reset winding means being connected to be energized from said source for establishing a normal flux condition of said transformer and for resetting the transformer to its normal flux condition after said static switch is turned off, and a voltage clipping device connected across said primary winding means to limit the reset rate of said transformer.

2. A pulse power supply comprising, a welding transformer including primary and secondary winding means and reset winding means, a static switch effective when turned on for supplying load current from a source of direct current voltage to said primary winding means, a timing circuit operable a predetermined time after energization thereof to produce a timing signal, said timing circuit being connected across said primary winding means for energization in response to turn on of said static switch and energization of said primary winding means, means for applying said timing signal to said static switch for turning off the static switch, said reset winding means being connected to be energized from said source for establishing a normal flux condition of said transformer and for resetting the transformer to its normal flux condition after said static switch is turned off, voltage clipping device connected across said primary winding means to limit the reset rate of said transformer, and means operable in response to an overload condition of load current to produce a control signal for turning off said static switch.

3. A pulse power supply comprising, means including a first semiconductor controlled rectifier effective when rendered conducting for supplying load current from a source of direct current voltage to a load, said first rectifier having gating means responsive to a gating signal for gating the first rectifier into a conducting condition, turn-on means operable to supply a gating signal to the gating means of said first rectifier to render the first rectifier conducting, a second semiconductor controlled rectifier having gating means responsive to a gating signal for gating the second rectifier into a conducting condition, a capacitor connected to be charged by the source of direct current voltage, circuit means for discharging said capacitor in response to conduction of said second rectifier for rendering said first rectifier non-conducting, a timing circuit operable a predetermined time after energization thereof to produce a timing signal, said timing circuit being connected across said load for energization in response to conduction of said first rectifier, and energization of said load, means for applying said timing signal to the gating means of said second rectifier for rendering the second rectifier conducting, and means for adjusting the time of production of said timing signal.

4. A pulse power supply comprising, means including a first semiconductor controlled rectifier effective when rendered conducting for supplying load current from a source of direct current voltage to a load, said first rectifier having gating means responsive to a gating signal for gating the first rectifier into a conducting condition, turn-on means operable to supply a gating signal to the gating means of said first rectifier to render the first rectifier having gating means responsive to a gating signal for gating the second rectifier into a conducting condition, a capacitor connected to be charged by the source of direct current voltage, circuit means for discharging said capacitor in response to conduction of said second rectifier for rendering said first rectifier non-conducting, a timing circuit operable a predetermined time after energization thereof to produce a timing signal, said timing circuit being connected across said load for energization in response to conduction of said first rectifier and energization of said load, means for applying said timing signal to the gating means of said second rectifier for rendering the second rectifier conducting, means for adjusting the time of production of said timing signal, and means operable in response to an overload condition of load current to apply a gating signal to the gating means of said second rectifier.

5. A pulse power supply comprising, means including a first controlled rectifier effective when rendered conducting for supplying load current from a source of direct current voltage to a load, said first rectifier having gating means responsive to a gating signal for gating the first rectifier into a conducting condition, turn-on means operable to supply a gating signal to the gating means of said first rectifier to render the first rectifier conducting, a second controlled rectifier having gating means responsive to a gating signal for gating the second rectifier into a conducting condition, an oscillatory circuit including a capacitor and an inductor operable in response to conduction of said second rectifier for rendering said first rectifier non-conducting, a timing circuit operable a predetermined time after energization thereof to produce a timing signal, said timing circuit being connected across said load for energization in response to conduction of said first rectifier and energization of said load, means for applying said timing signal to the gating means of said second rectifier for rendering the second rectifier conducting, means for adjusting the time of production of said timing signal, and means operable in response to an overload condition of load current to apply a gating signal to the gating means of said second rectifier and to simultaneously prevent operation of said turn-on means.

6. A pulse power supply comprising, means including a first controlled rectifier effective when rendered conducting for supplying load current from a source of direct current voltage to a load, said first rectifier having gating means responsive to a gating signal for gating the first rectifier into a conducting condition, turn-on means operable to supply a gating signal to the gating means of said first rectifier to render the first rectifier conducting, a second controlled rectifier having gating means responsive to a gating signal for gating the second rectifier into a conducting condition, an oscillatory circuit including a capacitor and an inductor operable in response to conduction of said second rectifier for rendering said first rectifier non-conducting, a timing circuit operable a predetermined time after energization thereof to produce a timing signal, said timing circuit being connected across said load for energization in response to conduction of said first rectifier and energization of said load, means for applying said timing signal to the gating means of said second rectifier for rendering the second rectifier conductive, means for adjusting the time of production of said timing signal, a reed switch having two oppositely poled coils, one of said coils being connected for energization from said source to maintain the reed switch normally closed, the other coil being connected for energization in accordance with load current to effect opening of the reed switch in response to an overload condition of load current, and means for applying a gating signal to the gating means of said second rectifier in response to opening of the reed switch.

7. A pulse power supply comprising, a welding transformer including primary and secondary winding means and reset winding means, means including a first controlled rectifier effective when rendered conducting for supplying load current from a source of direct current voltage to said primary winding means, said first rectifier having gating means responsive to a gating signal for gating the first rectifier into a conducting condition, turn-on means operable to supply a gating signal to the gating means of said first rectifier to render the first rectifier conducting, a second controlled rectifier having gating means responsive to a gating signal for gating the second rectifier into a conducting condition, an oscillatory circuit including a capacitor and an inductor operable in response to conduction of said second rectifier for rendering said first rectifier non-conducting, a timing circuit operable a predetermined time after energization thereof to produce a timing signal, said timing circuit being connected across said primary winding means for energization in response to conduction of said first rectifier and energization of said primary winding means, means for applying said timing signal to the gating means of said second rectifier for rendering the second rectifier conductive, means for adjusting the time of production of said timing signal, said reset winding means being connected to be energized from said source for establishing a normal flux condition of said transformer and for resetting the transformer to its normal flux condition after said first rectifier is rendered non-conducting, and a voltage clipping device connected across said primary winding means to limit the reset rate of said transformer.

8. A pulse power supply comprising, means including a first controlled rectifier effective when rendered conducting for supplying load current from a source of direct current voltage to a load, said first rectifier having gating means responsive to a gating signal for gating the first rectifier into a conducting condition, turn-on means operable to supply a gating signal to the gating means of said first rectifier to render the first rectifier conducting, a second controlled rectifier having gating means responsive to a gating signal for gating the second rectifier into a conducting condition, an oscillatory circuit including a capacitor and an inductor connected in series across said second rectifier, said capacitor being arranged for charging from said direct voltage source when said rectifiers are non-conducting, circuit means preventing discharge of said capacitor in response to conduction of said first rectifier, said capacitor being discharged in response to conduction of said second rectifier to initiate a full cycle of oscillation for rendering said first rectifier non-conducting, a timing circuit operable a predetermined time after energization thereof to produce a timing signal, said timing circuit being connected across said load for energization in response to conduction of said first rectifier and energization of said load, means for applying said timing signal to the gating means of said second rectifier for rendering the second rectifier conducting, and means for adjusting the time of production of said timing signal.

9. A pulse power supply comprising, means including a first controlled rectifier effective when rendered conducting for supplying load current from a source of direct current voltage to a load, said first rectifier having gating means responsive to a gating signal for gating the first rectifier into a conducting condition, turn-on means operable to supply a gating signal to the gating means of said first rectifier to render the first rectifier conducting, a second controlled rectifier having gating means responsive to a gating signal for gating the second rectifier into a conducting condition, an oscillatory circuit including a capacitor and an inductor connected in series across said second rectifier, said capacitor being arranged for charging from said direct voltage source when said rectifiers are non-conducting, circuit means preventing discharge of said capacitor in response to conduction of said first rectifier, said capacitor being discharged in response to conduction of said second rectifier to initiate a full cycle of oscillation for rendering said first rectifier non-conducting, a timing circuit operable a predetermined time after energization thereof to produce a timing signal, said timing circuit being connected across said load for energization in response to conduction of said first rectifier and energization of said load, means for applying said timing signal to the gating means of said second rectifier for rendering the second rectifier conductive, means for adjusting the time of production of said timing signal, and means operable in response to an overload condition of load current to apply a gating signal to the gating means of said second rectifier.

10. A pulse power supply comprising, a welding transformer including primary and secondary winding means, means including a first controlled rectifier effective when rendered conducting for supplying load current from a source of direct current voltage to said primary winding means, said first rectifier having gating means responsive to a gating signal for gating the first rectifier into a conducting condition, turn-on means including a first capacitor to be charged from said source, said first capacitor being effective when discharged to cause a gating pulse to be applied to the gating means of said first rectifier, and a switch actuable to discharge said first capacitor, a second controlled rectifier having gating means responsive to a gating signal for gating the second rectifier into a conducting condition, an oscillatory circuit including a second capacitor and an inductor connected in series across said second rectifier, said second capacitor being connected for charging from said direct voltage source when said rectifiers are non-conducting, circuit means preventing discharge of said second capacitor in response to conduction of said first rectifier, said second capacitor being discharged in response to conduction of said second rectifier to initiate a full cycle of oscillation for rendering said first rectifier non-conducting, a timing circuit operable a predetermined time after energization thereof to produce a timing signal, said timing circuit being connected across said primary winding means for energization in response to conduction of said first rectifier and energization of said primary winding means, means for applying said timing signal to the gating means of said second rectifier for rendering the second rectifier conducting, and means for adjusting the time of production of said timing signal after energization of said timing circuit.

11. A pulse power supply comprising, a welding transformer including primary and secondary winding means and reset winding means, means including a first controlled rectifier effective when rendered conducting for supplying load current from a source of direct current voltage to said primary winding means, said first rectifier having gating means responsive to a gating signal for gating the first rectifier into a conducting condition, turn-on means including a first capacitor to be charged from said source, said first capacitor being effective when discharged to cause a gating pulse to be applied to the gating means of said first rectifier, and a switch actuable to discharge said first capacitor, a second controlled rectifier having gating means responsive to a gating signal for gating the second rectifier into a conducting condition, an oscillatory circuit including a second capacitor and an inductor connected in series across said second rectifier, said second capacitor being connected for charging from said direct voltage source when said rectifiers are non-conducting, circuit means preventing discharge of said second capacitor in response to conduction of said first rectifier, said second capacitor being discharged in response to conduction of said second rectifier to initiate a full cycle of oscillation for rendering said first rectifier non-conducting, a timing circuit operable a predetermined time after energization thereof to produce a timing signal, said timing circuit being connected across said primary winding means for energization in response to conduction of said first rectifier and energization of said primary winding means, means for applying said timing signal to the gating means of said second rectifier for rendering the second rectifier conducting, means for adjusting the time of production of said timing signal after energization of said timing circuit, means operable in response to an overload condition of load current to apply a gating signal to the gating means of said second rectifier and to interrupt the discharge path of said first capacitor, said reset winding means being connected to be energized from said source for establishing a normal flux condition of said transformer and for resetting the transformer to its normal flux condition after said first rectifier is rendered non-conducting, and a voltage clipping device connected across said primary winding means to limit the reset rate of said transformer.

12. A multipulse power supply comprising, a static switch effective when turned on for supplying load current from a source of direct current voltage to a load, a pulse spacing timer operable a predetermined adjustable time after energization thereof to produce a turn on signal for turning on said static switch, said pulse spacing timer being connected across said static switch to be energized from said source in response to turn off of said static switch, a pulse width timer operable a predetermined adjustable time after energization thereof to produce a turn off signal for turning off said static switch, said pulse width timer being connected across said load for energization in response to turn on of said static switch and energization of said load, and means operable after said static switch has been turned on a predetermined number of times to prevent further production of turn on signals by said pulse spacing timer.

13. A multipulse power supply comprising, a static switch effective when turned on for supplying load current from a source of direct current voltage to a load, a pulse spacing timer operable a predetermined adjustable time after energization thereof to produce a first timing signal for turning on said static switch, said pulse spacing timer being connected across said static switch to be energized from said source in response to turn off of said static switch, a pulse width timer operable a predetermined adjustable time after energization thereof to produce a turn off signal for turning off said static switch, said pulse width timer being connected across said load for energization in response to turn on of said static switch and energization of said load, and a preset pulse counter including a capacitor connected to accumulate charge each time said static switch is turned on, means connected to discharge said capacitor when a predetermined charge is accumulated, and means response to discharge of said capacitor for preventing further production of timing signals by said pulse spacing timer.

14. A multipulse power supply comprising, a welding transformer having primary and secondary winding means, a static switch effective when turned on for supplying load current from a source of direct current voltage to said primary winding means, a pulse spacing timer operable a predetermined adjustable time after energization thereof to produce a turn on signal for turning on said static switch, initiation switch means actuable for connecting said pulse spacing timer to said source, said pulse spacing timer being connected across said static switch to be energized from said source initially in response to actuation of said switch means and thereafter in response to turn off of said static switch, a pulse width timer operable a predetermined adjustable time after energization thereof to produce a turn off signal for turning off said static switch, said pulse timer being connected across said primary winding means for energization in response to turn on of said static switch and energization of said primary winding means, a preset pulse counter responsive to load current for counting the number of times said static switch is turned on, and means effective after a predetermined count by said counter to turn off said static switch.

15. A multipulse power supply comprising, a welding transformer having primary and secondary winding means and reset winding means, a static switch effective when turned on for supplying load current from a source of direct current voltage to said primary winding means, a pulse spacing timer operable a predetermined adjustable time after energization thereof to produce a turn on signal for turning on said static switch, initiation switch means actuable for connecting said pulse spacing timer to said source, said pulse spacing timer being connected across said static switch to be energized from said source initially in response to actuation of said switch means and thereafter in response to turn off of said static switch, a pulse width timer operable a predetermined adjustable time after energization thereof to produce a turn off signal for turning off said static switch, said pulse width timer being connected across said primary winding means for energization in response to turn on of said static switch and energization of said primary winding means, a preset pulse counter responsive to load current for counting the number of times said static switch is turned on, and means effective after a predetermined count by said counter to turn off said static switch, said reset winding means being connected to be energized from said source for establishing a normal flux condition of said transformer and for resetting the transformer to its normal flux condition after each turn off of said static switch, a diode in series with said secondary winding means, and a voltage clipping device connected across said primary winding means to limit the reset rate of said transformer.

16. A multipulse power supply comprising, a static switch effective when turned on for supplying load current from a source of direct current voltage to a load, a pulse spacing timer operable a predetermined adjustable time after energization thereof to produce a turn on signal for turning on said static switch, said pulse spacing timer comprising a relaxation oscillator including a first unijunction transistor and a first capacitor connected to the emitter of said first transistor, a first circuit including said first capacitor connected across said static switch to charge the first capacitor from said source in response to turn off of said static switch, a pulse width timer operable a predetermined adjustable time after energization thereof to produce a turn off signal for turning off said static switch, said pulse width timer comprising a relaxation oscillator including a second unijunction transistor and a second capacitor connected to the emitter of said second transistor, a second circuit including said second capacitor connected across said load to charge the second capacitor in response to turn on of said static switch and energization of said load, a preset pulse counter responsive to load current for counting the number of times said static switch is turned on, and means effective after a predetermined count by said counter to prevent charging of said first capacitor.

17. A multipulse power supply comprising, a static switch effective when turned on for supplying load current from a source of direct current voltage to a load, a pulse spacing timer operable a predetermined adjustable time after energization thereof to produce a turn on signal for turning on said static switch, said pulse spacing timer comprising a relaxation oscillator including a first unijunction transistor and a first capacitor connected to the emitter of said first transistor, a first circuit including said first capacitor connected across said static switch to charge the first capacitor from said source in response to turn off of said static switch, a pulse width timer operable a predetermined adjustable time after energization thereof to produce a turn off signal for turning off said static switch, said pulse width timer comprising a relaxation oscillator including a second unijunction transistor and a second capacitor connected to the emitter of said second transistor, a second circuit including said second capacitor connected across said load to charge the second capacitor in response to turn on of said static switch and energization of said load, a preset pulse counter including a third capacitor connected to accumulate charge each time said static switch is turned on, means connected to discharge said third capacitor when a predetermined charge is accumulated, and means responsive to discharge of said third capacitor for preventing charging of said first capacitor.

18. A multipulse power supply comprising, means including a first controlled rectifier effective when rendered conducting for supplying load current from a source of direct current voltage to a load, means including a second controlled rectifier effective when rendered conducting to cause said first rectifier to become non-conducting, a pulse spacing timer operable a predetermined adjustable time after energization thereof to produce a first timing signal for rendering said first rectifier conducting, said pulse spacing timer being connected across said first rectifier to be energized from said source in response to the first rectifier being rendered non-conducting, a pulse width timer operable a predetermined adjustable time after energization thereof to produce a second timing signal for rendering said second rectifier conducting, said pulse width timer being connected for energization in response to conduction of said first rectifier, a preset pulse counter responsive to load current for counting the number of times said first rectifier is rendered conducting, and means effective after a predetermined count by said counter to prevent conduction of said first rectifier.

19. A multipulse power supply comprising, means including a first controlled rectifier effective when rendered conducting for supplying load current from a source of direct current voltage to a load, means including a second controlled rectifier effective when rendered conducting to cause said first rectifier to become nonconducting, a pulse spacing timer operable a predetermined adjustable time after energization thereof to produce a first timing signal for rendering said first rectifier conducting, said pulse spacing timer being connected across said first rectifier to be energized from said source in response to the first rectifier being rendered nonconducting, a pulse width timer operable a predetermined adjustable time after energization thereof to produce a second timing signal for rendering said second rectifier conducting, said pulse width timer being connected for energization in response to conduction of said first rectifier, a preset pulse counter including a capacitor connected to accumulate charge each time said first rectifier conducts, means connected to discharge said capacitor when a predetermined charge is accumulated thereby, means responsive to discharge of said capacitor for preventing operation of said pulse spacing timer, and means for applying an adjustable preset voltage to said capacitor.

20. A multipulse power supply comprising, a welding transformer having primary and secondary winding means and reset winding means, means including a first controlled rectifier effective when rendered conducting for supplying load current from a source of direct current voltage to said primary winding means, means including a second controlled rectifier effective when rendered conducting to cause said first rectifier to become non-conducting, a pulse spacing timer operable a predetermined adjustable time after energization thereof to produce a first timing signal for rendering said first rectifier conducting, said pulse spacing timer being connected across said first rectifier to be energized from said source in response to the first rectifier being rendered non-conducting, a pulse width timer operable a predetermined adjustable time after energization thereof to produce a second timing signal for rendering said second rectifier conducting, said pulse width timer being connected for energization in response to conduction of said first rectifier, a preset pulse counter responsive to load current for counting the number of times said first rectifier is rendered conducting, means effective after a predetermined count by said counter to prevent conduction of said first rectifier, said reset winding means being connected to be energized from said source for establishing a normal flux condition of said transformer and for resetting the transformer to its normal flux condition each time said first rectifier is rendered nonconducting, a diode in series with said secondary winding means, and a voltage clipping device connected across said primary winding means to limit the reset rate of said transformer.

21. A multipulse power supply comprising, a welding transformer having primary and secondary winding means and reset winding means, means including a first controlled rectifier effective when rendered conducting for supplying load current from a source of direct current voltage to said primary winding means, means including a second controlled rectifier effective when rendered conducting to cause said first rectifier to become non-conducting, a pulse spacing timer operable a predetermined adjustable time after energization thereof to produce a first timing signal for rendering said first rectifier conducting, said pulse spacing timer comprising a relaxation oscillator including a first unijunction transistor and a first capacitor connected to the emitter of said first transistor, a first circuit including said first capacitor connected across said first rectifier to charge the first capacitor from said source in response to said first rectifier being rendered non-conducting, a pulse width timer operable a predetermined adjustable time after energization thereof to produce a second timing signal for rendering said second rectifier conducting, said pulse width timer comprising a relaxation oscillator including a second unijunction transistor and a second capacitor connected to the emitter of said second transistor, a second circuit including said second capacitor connected across said primary winding means to charge the second capacitor in response to conduction of said first rectifier and energization of said primary winding means, a preset pulse counter responsive to load current for counting the number of times said first rectifier is rendered conducting, means effective after a predetermined count by said counter to prevent charging of said first capacitor, said reset winding means being connected to be energized from said source for establishing a normal flux condition of said transformer and for resetting the transformer to its normal flux condition each time said first rectifier is rendered non-conducting, a diode in series with said secondary winding means, and a voltage clipping device connected across said primary winding means to limit the reset rate of said transformer.

22. A multipulse power supply comprising, a welding transformer having primary and secondary winding means and reset winding means, means including a first controlled rectifier effective when rendered conducting for supplying load current from a source of direct current voltage to said primary winding means, a second controlled rectifier, an oscillatory circuit including a first capacitor and an inductor connected in series across said second rectifier, said first capacitor being connected for charging from said source when said rectifiers are non-conducting, circuit means preventing discharge of said first capacitor in response to conduction of said first rectifier, said first capacitor being discharged in response to conduction of said second rectifier to initiate a full cycle of oscillation for rendering said first rectifier non-conducting, a pulse spacing timer operable a predetermined adjustable time after energization thereof to produce a first timing signal for rendering said first rectifier conducting, said pulse spacing timer comprising a relaxation oscillator including a first unijunction transistor and a second capacitor connected to the emitter of said first transistor, initiation switch means, a first circuit including said switch means and said second capacitor connected across said first rectifier to charge the second capacitor from said source initially in response to actuation of said switch means and thereafter in response to the first rectifier being rendered non-conducting, a pulse width timer operable a predetermined adjustable time after energization thereof to produce a second timing signal for rendering said second rectifier conducting, said pulse width timer comprising a relaxation oscillator including a second unijunction transistor and a third capacitor connected to the emitter of said second transistor, a second circuit including said third capacitor connected across said primary winding means to charge said third capacitor in response to conduction of said first rectifier, a preset pulse counter including a fourth capacitor connected to accumulate charge each time said first rectifier conducts, means connected to discharge said fourth capacitor when a predetermined charge is accumulated thereby, means responsive to discharge of said fourth capacitor for preventing charging of said second capacitor, said reset winding means being connected to be energized from said source for establishing a normal flux condition of said transformer and for resetting the transformer to its normal flux condition each time said first rectifier is rendered non-conducting, a diode in series with said secondary winding means, and a voltage clipping device connected across said primary winding means to limit the reset rate of said transformer.

23. A multipulse power supply comprising, a welding transformer having primary and secondary winding means and reset winding means, means including a first controlled rectifier effective when rendered conducting for supplying load current from a source of direct current voltage to said primary winding means, a second controlled rectifier, an oscillatory circuit including a first capacitor and an inductor connected in series across said second rectifier, said first capacitor being connected for charging from said source when said rectifiers are non-conducting, circuit means preventing discharge of said first capacitor in response to conduction of said first rectifier, said first capacitor being discharged in response to conduction of said second rectifier to initiate a full cycle of oscillation for rendering said first rectifier non-conducting, a pulse spacing timer operable a predetermined adjustable time after energization thereof to produce a first timing signal for rendering said first rectifier conducting, said pulse spacing timer comprising a relaxation oscillator including a first unijunction transistor and a second capacitor connected to the emitter of said first transistor, initiation switch means, a first circuit including said switch means and said second capacitor connected across said first rectifier to charge the second capacitor from said source initially in response to actuation of said switch means and thereafter in response to the first rectifier being rendered non-conducting, a pulse width timer operable a predetermined adjustable time after energization thereof to produce a second timing signal for rendering said second rectifier conducting, said pulse width timer comprising a relaxation oscillator including a second unijunction transistor and a third capacitor connected to the emitter of said second transistor, a second circuit including said third capacitor connected across said primary winding means to charge said third capacitor in response to conduction of said first rectifier, a preset pulse counter including a fourth capacitor connector to accumulate charge each time said first rectifier conducts, means connected to discharge said fourth capacitor when a predetermined charge is accumulated thereby, means responsive to discharge of said fourth capacitor for preventing charging of said second capacitor, said reset winding means being connected to be energized from said source for establishing a normal flux condition of said transformer and for resetting the transformer to its normal flux condition each time said first rectifier is rendered non-conducting, a diode in series with said secondary winding means, and a voltage clipping device connected across said primary winding means to limit the reset rate of said transformer, each of said relaxation oscillators including additionally a separate pulse transformer having a primary winding connected to a base of the associated transistor and having a secondary winding connected to supply the timing signal to the associated controlled rectifier.

24. A multipulse power supply comprising, means including a first controlled rectifier effective when rendered conducting for supplying load current from source of voltage to a load, means including a second controlled rectifier effective when rendered conducting to cause said first rectifier to become nonconducting, a pulse spacing timer operable a predetermined adjustable time after energization thereof to produce a first timing signal for rendering said first rectifier conducting, said pulse spacing timer being connected across said first rectifier to be energized from said source in response to the first rectifier being rendered nonconducting, and pulse width timer operable a predetermined adjustable time after energization thereof to produce a second timing signal for rendering said second rectifier conducting, said pulse width timer being connected for energization in response to conduction of said first rectifier.

References Cited by the Examiner

UNITED STATES PATENTS

| | | | |
|---|---|---|---|
| 2,166,306 | 7/1939 | Levoy | 328—73 |
| 2,462,897 | 3/1949 | Rector | 328—210 X |
| 2,653,236 | 9/1953 | Phelan | 328—39 |
| 2,679,594 | 5/1954 | Fromm | 331—111 |
| 2,807,719 | 9/1957 | Cattermole | 331—111 |
| 2,906,888 | 9/1959 | Bray | 307—88.5 |
| 2,985,846 | 5/1961 | Applegate | 331—112 |
| 3,040,270 | 6/1962 | Gutzwiller | 307—88.5 |
| 3,051,852 | 8/1962 | Mintz et al. | 307—88.5 |
| 3,074,008 | 1/1963 | McPhail et al. | 307—88.5 |
| 3,111,591 | 11/1963 | Conron et al. | 307—88.5 |

OTHER REFERENCES

S.S.I.P. Bulletin D410–02, applications and circuit design notes 3–60, page 4.

ARTHUR GAUSS, *Primary Examiner.*

JOHN W. HUCKERT, *Examiner.*

B. P. DAVIS, *Assistant Examiner.*